B. P. Crandall,
Hobby Horse.
No. 98,929. Patented Jan. 18, 1870.
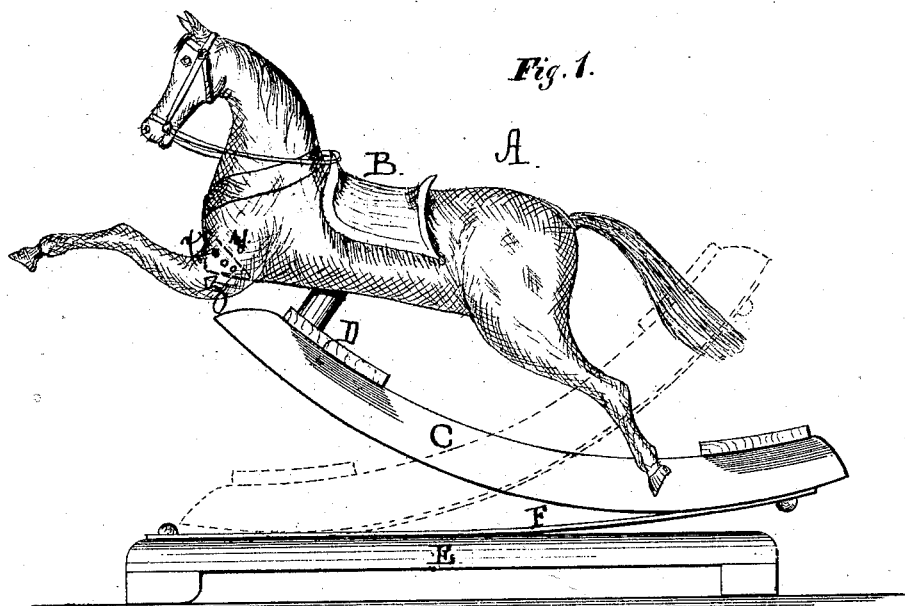
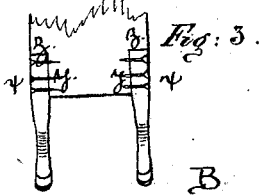
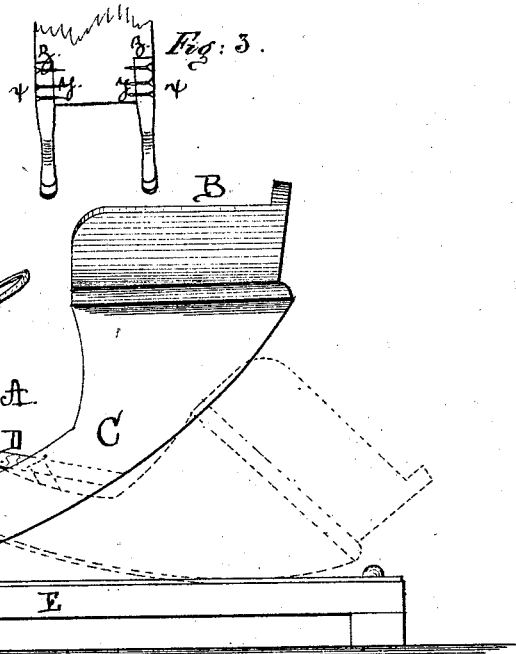
Witnesses:
Will H. Finckel
Will S. Peyton
Inventor:
Benj. P. Crandall
by John A. Wiedersheim
atty

United States Patent Office.

BENJAMIN P. CRANDALL, OF NEW YORK, N. Y.

Letters Patent No. 98,929, dated January 18, 1870.

ROCKING-HORSE.

The Schedule referred to in these Letters Patent and making part of the same.

To all whom it may concern:

Be it known that I, BENJAMIN P. CRANDALL, of the city, county, and State of New York, have invented a new and useful Improvement in Children's Rockers; and I do hereby declare the following to be a clear and exact description of the nature thereof, sufficient to enable others skilled in the art to which my invention appertains, to fully understand and use the same, reference being had to the accompanying drawings, making part of this specification, in which—

Figures 1 and 2 are side elevations of the device, illustrating my invention; and Figure 3 is a detailed view.

Similar letters of reference indicate corresponding parts in the three figures.

My invention consists in connecting to one end of the rockers of a rocking-horse or children's rocker, two or more spring-strips, which shall lie flat on the bed or platform on which the horse rocks or rides, and be connected to said bed or platform below the free end of the rockers, whereby the seat on the horse or rocker will be elevated, and thus remain in a position to be depressed, so soon as the child takes his seat thereon, and allow the subsequent operation of rocking or riding to be easily and uniformly performed, and thus produce a device which will be pleasurable to children.

In the drawings—

A represents a hobby-horse or children's rocker, made in the usual manner, with seat B, rockers C, and foot-rest D.

The horse or rocker is mounted on a bed or platform, E, and is adapted to rock over or ride thereon.

On this bed or platform, I lay two or more flat spring-strips, F, which extend longitudinally and parallel to each other, and in line beneath the rockers, so that the horse or rocker will move over the strips, but its weight will be received directly on the bed or platform.

These spring-strips are secured, at one end, to one end of the bed or platform, and at the other end to one end of the rockers, so that the seat or riding-portion of the horse or rocker will always be elevated when there is no weight thereon.

The object of this arrangement is, that the horse or rocker will be in position to commence riding. The first movement is to depress the seat in the direction of the arrow, a large space or field being provided for that purpose. The subsequent operation of rocking or riding is easily performed, the child acting as usual, but greatly assisted in its efforts by the actions of the springs. When the seat is depressed, the ends of the springs which are connected to the rockers are elevated, so that the springs bend upon the curvilinear bottom of the rockers.

In no case are the springs, in any position, to destroy the appearance of the horse or rocker. They are either flat upon the bed or platform or bent under the rockers, and in contact therewith.

Having thus described my invention,

What I claim as new, and desire to secure by Letters Patent, is—

As an improvement in rocking-horses, the horse, mounted on a flat bed, and having its seat out of centre, in combination with the spring-strips secured to the rockers and the bed, so that the seat is elevated, the whole constructed and operating together, as herein described.

The above signed by me, this  day of  , 1869.

BENJAMIN P. CRANDALL.

Witnesses:
JOHN A. WIEDERSHEIM,
WILL. H. FINCKEL.